UNITED STATES PATENT OFFICE.

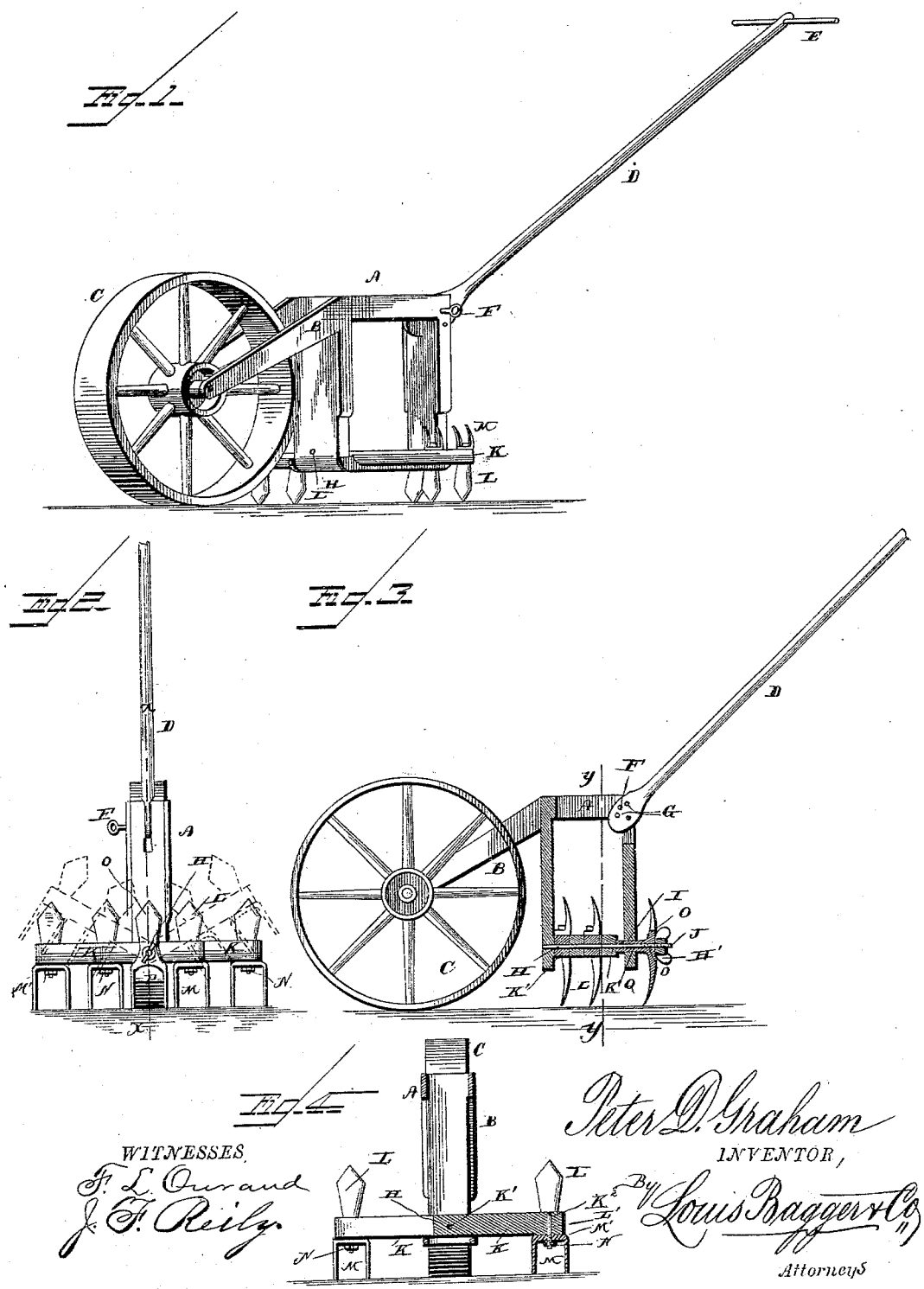

PETER DUNLAP GRAHAM, OF CORUNNA, INDIANA.

GARDEN-CULTIVATOR.

SPECIFICATION forming part of Letters Patent No. 331,960, dated December 8, 1885.

Application filed September 15, 1885. Serial No. 177,203. (No model.)

*To all whom it may concern:*

Be it known that I, PETER D. GRAHAM, a citizen of the United States, and a resident of Corunna, in the county of De Kalb and State of Indiana, have invented certain new and useful Improvements in Garden-Cultivators; and I do hereby declare that the following is a full, clear, and exact description of the invention, which will enable others skilled in the art to which it appertains to make and use the same, reference being had to the accompanying drawings, which form a part of this specification.

My invention relates to that class of implements for cultivating the soil which are known as "garden-cultivators," and which are more particularly adapted to be manipulated by hand-power, and has for its object to provide a device or implement of this class which shall possess superior advantages in the points of simplicity of construction, durability, and general efficiency of operation.

To these ends my invention consists in the improved construction, arrangement, and combination of parts which will be hereinafter fully described and claimed.

Referring to the annexed drawings, Figure 1 is a perspective view of my improved garden-cultivator, showing the several arms in their horizontal positions, ready for use. Fig. 2 is a rear elevation of the same, showing the arms adjusted in a reversed position to that shown in Fig. 1, in order to bring a different set of cultivator-tools into position for use, dotted lines showing several of the arms raised or tilted to an inclined position to adapt them for working in furrows. Fig. 3 is a longitudinal vertical sectional view of the cultivator, taken on line $x\,x$ in Fig. 2; and Fig. 4 is a transverse vertical sectional view taken on the plane indicated by line $y\,y$ in Fig. 3 of the drawings.

The same letters of reference indicate corresponding parts in all the figures.

Referring to the several parts by letter, A represents a suitably-constructed frame, preferably rectangular in shape, and formed at its forward upper end with the forwardly and downwardly projecting arms B B, between which is journaled a wheel, C, which serves in practice to support the frame of the machine. Between the upper rear ends or corners of the rectangular frame A is pivotally secured the lower end of the handle D, the upper end of which is provided with a transverse hand-piece, E, which affords a convenient hand-hold for the operator, the said handle-bar D being adapted to be adjusted at various heights to suit the convenience of the operator by means of an adjusting-pin, F, adapted to pass transversely through the upper rear corner of the frame A, and through any one of a series of apertures, G G, formed in the lower flattened end of the handle-bar concentrically with the pivoting-pin, as shown in Fig. 3 of the drawings.

The lower portion of the frame A is provided with a longitudinal horizontal rod or bar, H, one end of which is rigidly secured near the lower end of one of the vertical bars of the frame, the other end of the said rod or bar H passing through an aperture, I, in the lower end of the opposite vertical bar of the frame. The free end of this rod H is screw-threaded at and beyond the point where it passes through the aperture I, as shown at J. A series of arms, K K, provided at their inner ends with suitable transverse apertures, K', are mounted pivotally upon the rod H, between the front and rear vertical end pieces of the frame A, the said arms being arranged in pairs of unequal length, as shown in the drawings. In the drawings hereto annexed only two pairs of these arms are shown as employed, and this will probably be the number of arms usually employed; but I do not restrict myself to any particular number of the said arms. Each of these arms K K is formed at its outer end with a vertical perforation, K², through which is inserted the shank L' of a suitably-constructed cultivator-shovel, L, the said shank being of such a length that its extremity projects some distance through the arm K, and on the said extremity is secured a pair of rake-teeth, M, which are connected by a cross piece or head, M', which is provided with a central perforation to adapt it to be adjusted upon the shank L' of the cultivator-blade. The extremity of this shank L' is screw-threaded, as shown, and provided with a nut, N, by tightening which both the cultivator-blade and the rake-teeth will be firmly secured in their operative positions at the end of the pivoted arm to which they are applied.

O indicates a single cultivator-blade, which is formed in a single piece with two rake-teeth, P P, the said cultivator-blade being provided with a perforation, o, to adapt it to be adjusted upon the free extremity of the horizontal rod H, being further provided with a projecting sleeve, Q, which surrounds the rod H, and extends through the aperture I in the lower end of the vertical bar of the frame A, so as to bear against and press together the inner ends of the arms K K, as more clearly shown in Fig. 3 of the drawings. The screw-threaded end of the rod H is provided with a nut, H', by tightening which the cultivator-blade O will, together with its projecting sleeve Q, be driven toward the opposite end of the horizontal bar H, and as the said sleeve Q extends through the aperture I its inner end will bear against and bind together the inner ends of the several arms K K, and also the single cultivator-blade O, in their several adjusted positions.

From the foregoing description, taken in connection with the accompanying drawings, the construction and operation of my improved cultivator will be readily understood without requiring further explanation.

When the arms carrying the cultivator blades and rakes are not in use, they may be folded up between the front and rear bars of the frame A, and when they are in this position the single cultivator-blade may be used by itself. In using the device the frame A is supported upon the wheel C, and is propelled by the operator pushing it over the ground by laying hold of the cross-bar of the handle, by raising and lowering which the operator may easily regulate the depth to which the blades shall enter the ground. It is obvious, however, that the device may be readily converted into a horse-cultivator by attaching a suitable hitching device to the front of the frame A, and substituting ordinary plow-handles for the handle-bar herein shown and described.

When it shall be desired to cultivate between the rows of growing plants, the arms of each pair may, after first loosening the nut at the end of the rod H, be tilted down to opposite sides until they rest upon the bottom bars of the frame A, relatively to which the rod H is so disposed that when the said arms are tilted down they shall all be in a horizontal position. The nut may then be again tightened, and the device is then ready for work. By turning the central cultivator-blade, O, out of position the cultivator may be made to straddle a row. When necessary, in order to accommodate the machine to varying distances between the rows of plants, one or more of the arms K may be turned up out of working position and the remainder retained in position. Practice will easily suggest which of the arms should be thus turned up out of position. When the machine is to be used to work in furrows, for the purpose of cultivating the sides of beds and ridges, the several arms K K may be placed in an inclined or tilted position, as shown in dotted lines in Fig. 2 of the drawings, the angle at which the arms are placed corresponding to the angle of the ground to be cultivated. When desired, the arms K may be turned down in an opposite direction to that shown in Fig. 1 of the drawings, so as to place the rake-teeth in operative position, as shown in Fig. 2, which is frequently desirable.

By reason of the before-described method of attaching the cultivator-blades it will be found easy at any time to loosen the nuts upon the shanks of said blades, which latter may then be turned and set quartering, or at an angle, so as to throw the soil either toward or from the plants which are being cultivated.

Many other advantages and methods of using my improved garden-cultivator will readily suggest themselves to those skilled in the art to which it appertains. The construction of the implement is simple and inexpensive, and it may be easily and conveniently manipulated.

In the practical manufacture of this implement it may be found desirable sometimes to make various changes in the construction and arrangement of details. Thus the shape of the cultivator-blades might be altered; or other suitable tools might be substituted for the rake-teeth; or a turning-plow might be temporarily attached at the heel end of the frame A in place of the blade O, and various other changes may be made without departing from the spirit of my invention.

Having thus described my invention, what I claim, and desire to secure by Letters Patent of the United States, is—

1. As an improvement in garden-cultivators, the combination, with the main frame, of the reversible arms having at their outer ends the adjustable and removable tools, arranged as described, for the purpose set forth.

2. As an improvement in garden-cultivators, the combination, with the main frame, of the reversible arms arranged in pairs of different length, and provided at their outer ends with the adjustable and removable tools, arranged as described, for the purpose set forth.

3. As an improvement in garden-cultivators, the combination, with the main frame, of the longitudinal horizontal rod, arranged as described, in the lower portion of the said frame and provided with the screw-threaded free extremity, the reversible arms having the transverse apertures in their inner ends, and provided at their outer ends with the adjustable and removable tools, arranged as described, and means for securing the said arms in their adjusted positions, as set forth.

4. As an improvement in garden-cultivators, the combination, with the main frame, of the longitudinal horizontal rod, arranged as described, in the lower portion of the said frame and provided with the screw-threaded free extremity, the reversible arms having the transverse apertures in their inner ends, and provided at their outer ends with the adjustable and removable tools, arranged as described, the central tool consisting of a cultivator-blade and rake-teeth formed in a single piece, and having the inwardly-projecting sleeve, and the binding-nut working on the free extremity of the horizontal rod, all constructed and arranged in the manner and for the purpose herein shown and set forth.

5. As an improvement in garden-cultivators, the combination, with the main frame, of the longitudinal horizontal rod, arranged as described, in the lower portion of the said frame, and provided with the screw-threaded free extremity, the reversible arms, arranged in pairs of different length, having the transverse apertures in their inner ends, and provided at their outer ends with the adjustable and removable tools, arranged as described, and means for securing the said arms in their adjusted positions, as set forth.

6. As an improvement in garden-cultivators, the combination, with the main frame, of the longitudinal horizontal rod, arranged as described, in the lower portion of the said frame, and provided with the screw-threaded free extremity, the reversible arms, arranged in pairs of different length, having the transverse apertures in the inner ends, and provided at their outer ends with the adjustable and removable tools, arranged as described, the central tool consisting of a cultivator-blade and rake-teeth formed in a single piece, and having the inwardly-projecting sleeve, and the binding-nut working on the free extremity of the horizontal rod, all constructed and arranged in the manner and for the purpose shown and set forth.

7. As an improvement in garden-cultivators, the combination, with the reversible arms, arranged as described, and provided at their outer ends with the vertical apertures, of the adjustable and removable tools, consisting of the cultivator-blades having the screw-threaded shank, the rake-teeth connected by the cross-head, having the central aperture, and the binding-nuts for securing the tools in their adjusted positions, as set forth.

In testimony that I claim the foregoing as my own I have hereunto affixed my signature in presence of two witnesses.

PETER DUNLAP GRAHAM.

Witnesses:
A. E. FOLTZ,
C. C. CISSEL.